US006741381B1

United States Patent
Levenson et al.

(10) Patent No.: US 6,741,381 B1
(45) Date of Patent: May 25, 2004

(54) MODIFIED TUNABLE ACOUSTO-OPTIC FILTER

(75) Inventors: Marc Levenson, Campbell, CA (US); Robert Lodenkemper, Sunnyvale, CA (US)

(73) Assignee: Picarro, Inc., Sunnyvale, CA (US)

( * ) Notice: Subject to any disclaimer, the term of this patent is extended or adjusted under 35 U.S.C. 154(b) by 0 days.

(21) Appl. No.: 10/291,073

(22) Filed: Nov. 8, 2002

(51) Int. Cl.[7] .................................................. G02F 1/11
(52) U.S. Cl. .................... 359/285; 359/286; 359/287
(58) Field of Search ................. 359/285–287, 359/305–314

(56) References Cited

U.S. PATENT DOCUMENTS 3,679,288 A * 7/1972 Harris ......................... 359/314
3,822,929 A * 7/1974 Heidrich et al. ............. 359/308
4,629,879 A * 12/1986 Baldwin et al. ............. 250/205
4,720,177 A * 1/1988 Chang ......................... 359/305

* cited by examiner

Primary Examiner—Hung Xuan Dang
Assistant Examiner—Joseph Martinez
(74) Attorney, Agent, or Firm—Herbert G. Burkard; John F. Schipper

(57) ABSTRACT

Acousto-optical filter systems for filtering a light beam by generating undiffracted and diffracted light beams within a birefringent crystal and by suppressing the diffracted beam within or at a face of the crystal. Where the two beams are noncollinear, an aperture provides diffracted beam suppression. Where the two beams have different polarization directions, the diffracted beam is suppressed by a polarization analyzer, internal reflection of each beam at a Brewster angle at the surface, total internal reflection of the diffracted beam at the surface, or a suitably oriented multilayer thin film at the surface. Variation of the acoustic frequency provides tunability of the filter.

14 Claims, 3 Drawing Sheets

MODIFIED TUNABLE ACOUSTO-OPTIC FILTER

FIELD OF THE INVENTION

This invention relates to tunable acousto-optical filters.

BACKGROUND OF THE INVENTION

Acousto-optic (AO) devices are described in textbooks, such as J. Xu and R. Stroud, *Acousto-Optice Devices: Principles Design and Applications*, Wiley, N.Y., 1992. The AO interaction is a parametric three-wave mixing process where an incident optical beam and acoustic beam interact to generate a second optical beam. The second optical beam generated by an AO interaction is referred to as the first order or diffracted beam. The portion of the incident optical beam that is not converted to the first order beam is referred to as the zeroth order or undiffracted beam.

The efficiency of an AO interaction (i.e. the amount of optical power transferred from the zeroth order beam to the first order beam) is partly determined by energy and momentum conservation considerations, usually referred to collectively as "phasematching". Energy conservation requires the following relation to hold:

$$f_d = f_i \pm f_a, \quad (1)$$

where $f_i$ is the frequency of the incident optical beam, $f_a$ is the acoustic frequency, and $f_d$ is the frequency of the diffracted optical beam. Thus the frequency of the diffracted beam is shifted up or down relative to the incident optical frequency by an amount equal to the acoustic frequency. If momentum conservation is exactly satisfied, then the following relation holds:

$$k_d = k_i \pm k_a, \quad (2)$$

where $k_i$, $k_d$ and $k_a$ are the incident optical, diffracted optical and acoustic wave vectors respectively. The determination of the sign in Eqs. (1) and (2) is discussed later.

Geometrically, this situation can be represented in a phasematching diagram as in FIG. 1A, where the three vectors form a closed triangle. In this case, phasematching is achieved, and the efficiency of the AO interaction is maximized. If Eq. (2) is not exactly satisfied, the efficiency of the AO interaction is reduced, and this reduction in efficiency generally increases as the departure from exact phasematching increases.

The spectral filtering properties of an AO device are mainly determined by phasematching. Consider an AO device where phasematching is exactly satisfied for an incident optical wavelength $\lambda_c$, as represented in FIG. 1A. If the incident optical wavelength $\lambda$ is reduced, the phasematching diagram is as represented in FIG. 1B. In FIG. 1B, the vector length $|k_i|$ is greater than in FIG. 1A, but lies in the same direction. The acoustic wave vector $k_a$ has the same magnitude and direction in FIGS. 1A and 1B, because the acoustic frequency is held constant, and the acoustic direction is determined by device geometry. The length of the vector $k_d$ increases, due to the energy conservation requirement of Eq. (1). Because the acoustic frequency shift of the diffracted optical beam is a negligible fraction of a typical optical frequency, the vectors $k_i$ and $k_d$ increase in length approximately proportionally. Given the geometrical constraints outlined above, it is clear that the phasematching triangle cannot be exactly closed for $\lambda < \lambda_c$, no matter what the direction of $k_d$ is, as indicated in FIG. 1B. Furthermore, as $|\lambda - \lambda_c|$ increases, the departure from the exact phase-matching condition of FIG. 2A increases.

These considerations indicate that an AO device acts as a bandpass filter in first order transmission, because only wavelengths that are sufficiently near the center wavelength $\lambda_c$ are efficiently diffracted from the zeroth order beam to the first order beam. An AO device in zeroth order transmission acts as the corresponding notch filter, as indicated in FIG. 2, where transmission is generally high except for wavelengths near $\lambda_c$ which are efficiently converted to the first order beam. These optical filters are tunable: changing the acoustic frequency will change the length of the acoustic wave vector $k_a$, and thus change the center wavelength $\lambda_c$.

As indicated above, there is a sign ambiguity in Eqs. (1) and (2), where either the sum or the difference of the optical and acoustic wave vectors is indicated. In practice, one of these two alternatives is typically much more nearly phase-matched than the other, and is therefore the only relevant possibility. This determination of the relevant interaction fixes the signs in Eqs. (1) and (2), because the signs are necessarily the same in the two equations. For example, FIGS. 1A and 1B correspond to use of a + sign in Eqs. (1) and (2), because it is clear that the difference between $k_d$ and $k_i + k_a$ is much smaller than the difference between $k_d$ and $k_i - k_a$, even if the direction of $k_d$ is chosen in both cases to minimize these differences.

In order to realize a first order bandpass filter, or a zeroth order notch filter, with an AO device, it is necessary to suppress the undesired beam. Although the zeroth and first order beams are always distinguishable in principle, due to the frequency shift of Eq. (1), it is more practical to suppress the undesired beam based on other possible differences between the two beams, such as having different states of polarization. For example, S. E. Harris and R. W. Wallace (Jour. Opt. Soc. Amer., vol. 59 (1969) pp. 744–747) disclose a tunable bandpass filter where a separate polarizer is used to suppress the zeroth order beam and transmit the first order beam. U.S. Pat. No. 3,644,015, issued to Hearn, discloses a tunable notch filter where a separate polarizer, spaced apart from the AO converter, is used to suppress the first order beam and transmit the zeroth order beam.

In a co-pending application, U.S. Ser. No. 10/086,283, the use of an AO device operating in zeroth order transmission as a laser tuning element is taught. For such applications, it is advantageous to suppress the first order beam within the AO device itself, to reduce the number of extraneous beams in the laser cavity.

What is needed is an AO filter assembly having no first order beam emission and suitable for use as a laser tuning element. The assembly should provide an output coupler that suppresses the diffracted beam. Preferably, this approach should permit use of collinear and/or non-collinear optical beams. Therefore, different methods of beam discrimination should be provided.

SUMMARY OF THE INVENTION

These needs are met by the invention, which provides several methods, which are individually applicable to collinear optical beams and/or to non-collinear optical beams, for receiving and coupling out an undiffracted beam from an AO filter assembly and for suppressing a diffracted beam component so that the diffracted beam does not leave the crystal. Tunability is provided through variation of acoustic frequency.

In each approach, an optical beam and an acoustic beam are introduced into an acoustically and optically anisotropic crystal, at a selected orientation relative to each other, and allowed to interact to produce an undiffracted light beam and a diffracted light beam. The diffracted beam is received by an output coupler, which can be affixed to or be an integral part of the crystal at a face thereof, and is partly or fully suppressed, and a portion of the undiffracted beam exits from the crystal/coupler.

In a first approach, the diffracted and undiffracted beams are noncollinear, and the output coupler is an aperture having a small diameter and positioned to permit passage of most or all of the undiffracted beam from the crystal and to block substantially all of the diffracted beam. In an alternative approach, the diffracted and undiffracted beams are perpendicularly polarized relative to each other, and the output coupler is a polarization-selective component that permits an undiffracted light beam having a first polarization direction to exit from the crystal and suppresses a diffracted light beam having a second polarization direction that is perpendicular to the first direction. In another alternative approach, the undiffracted and diffracted beams have separate polarization directions, and a crystal surface is oriented to receive the two beams so that (i) the diffracted beam polarization direction is in the plane of incidence, and (ii) the diffracted beam approaches the surface at a Brewster angle for this surface, thereby extinguishing the diffracted beam component that would otherwise be reflected from this surface.

In other alternative approaches: (1) a multilayer band pass coating on an exit face transmits light for the undiffracted beam incidence angle but reflects light for the diffracted beam incidence angle; or (2) the diffracted beam is totally internally reflected and a portion of the undiffracted beam is transmitted at an exit face.

DESCRIPTION OF ALTERNATIVE MODES OF THE INVENTION

Figure 3:
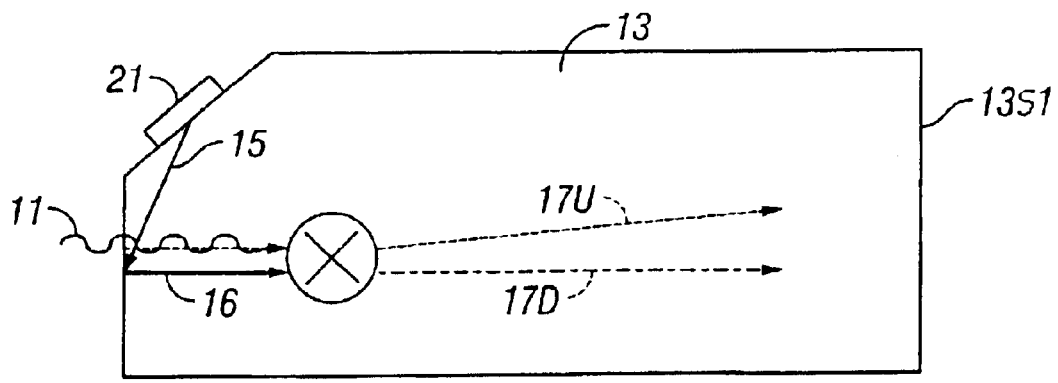
FIG. 3 schematically illustrates an acousto-optic interaction in a birefringent crystal to provide an undiffracted light beam and a diffracted light beam.

FIG. 3 is a schematic view illustrating interaction of an incident optical beam 11 and an acoustic beam 16 within an optically and acoustically anisotropic crystal 13 thereby generating an undiffracted optical beam 17U and a diffracted optical beam 17D, both of which propagate within the crystal. An acoustic transducer 21 is affixed to the crystal 13 and is oriented to provide an acoustic wave field that moves across the crystal interior in a selected acoustic wave propagation direction. A light source (not shown), contiguous to or spaced apart from the crystal 13, provides the incident optical beam 11 within the crystal.

Figure 1A:
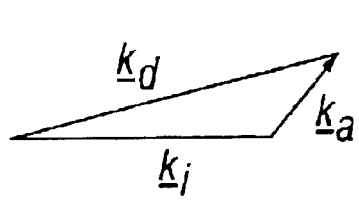
FIG. 1A and 1B illustrate exact and approximate phase matching in an acousto-optical interaction.
Figure 1B:
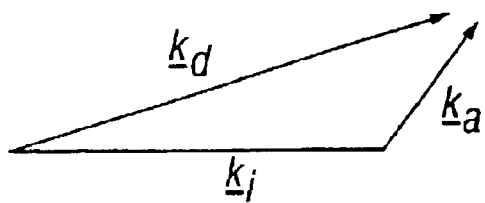

Although the AO interaction can occur in all materials, certain materials such as $TeO_2$ and $Hg_2Cl_2$, are preferred for AO devices, since the AO figure of merit for such a material is very high. For these particular materials it is impossible for a collinearly phasematched AO interaction (i.e. where the triangles on FIGS. 1A and 1B reduce to lines) to occur, due to crystal symmetry. Thus, in $TeO_2$ or $Hg_2Cl_2$, the phasematching must be noncollinear, as indicated in FIG. 1A and 1B.

In an AO device, the interacting waves are beams rather than plane waves. A beam propagates in the direction of its group velocity. In an anisotropic medium, such as $TeO_2$ or $Hg_2Cl_2$, the group velocity of a beam typically does not have the same magnitude or direction as the phase velocity of the plane wave that most closely approximates the beam. It is known, for example, from U.S. Pat. No. 3,687,521, issued to Kusters, that substantially collinear alignment of an incident optical beam group velocity with the acoustical beam group velocity, whereby these two beams overlap, provides the advantages of reduced RF power consumption and narrower bandwidth. Furthermore, Kusters also shows that this desirable beam collinearity can be obtained in noncollinearly phase matched devices. The collinear beam AO interaction in $TeO_2$ is taught by Voloshinov (Opt. Eng. 31(10) p. 2089 1992). A simple and known method for achieving beam collinearity is shown on FIG. 3, where an acoustic beam 15 is emitted from transducer 21 such that upon reflection from an input face of a crystal 13, the reflected acoustic beam 16 is aligned with optical beam 11. Alternatively, reflection of the acoustic beam 15 from an output face of the crystal 13 can also be implemented.

FIG. 3 illustrates a preferred embodiment of the present invention, where beam collinearity is obtained via acoustic reflection in a manner consistent with the use of preferred AO materials such as $TeO_2$ or $Hg_2Cl_2$. However, the present invention does not require beam collinearity or the use of particular materials such as $TeO_2$ or $Hg_2Cl_2$. Various output couplers, discussed in more detail below, may be attached to, or formed from, surface 13S1 on FIG. 3 in order to suppress the first order beam and provide output of the zeroth order beam.

Figure 4:
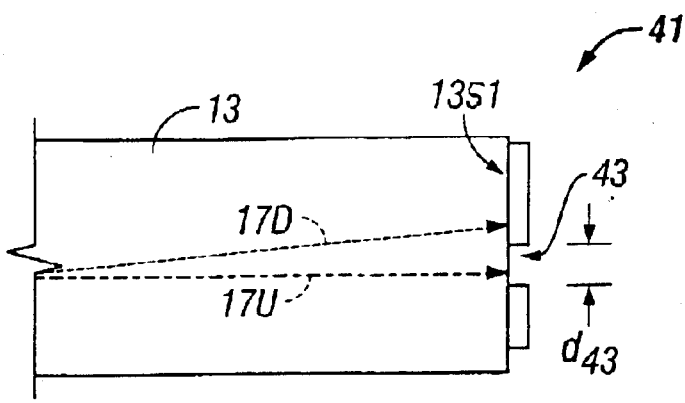
FIG. 4 schematically illustrates an output coupler where the diffracted and undiffracted beams are noncollinear.

FIG. 4 schematically illustrates an output coupler system 41 suitable for use in situations where the zeroth and first order beams propagate in slightly different directions. The zeroth order and first order beams propagate in different directions if their group velocity vectors are in different directions, which is typically the case if the phasematching is noncollinear. Thus, the output coupler of FIG. 4 is applicable to the preferred configuration of FIG. 3. In a practical situation, using an incident optical beam with a visible wavelength, an acoustic beam with an associated frequency of 500 MHz, and a $LiNbO_3$ crystal, the angular deviation between these propagation directions is likely to be in a range of 1–4° so that angular separation is possible. An optical aperture 43, having a selected diameter $d_{43}$, is located at the crystal face 13S1 and is arranged so that (1) all or a selected fraction of the undiffracted beam 17U is transmitted through the aperture and out of the crystal and (2) substantially all of the diffracted beam 17D is received by an opaque or light-absorbing portion of the aperture, and substantially none of the diffracted beam 17D issues from the crystal. Methods for determining the diameter d43 to achieve beam separation at the surface 13S1, for arbitrary diffracted and undiffracted beam diameters, are known in the art. Note that the aperture 43 is affixed to, or is an integral part of, the crystal 13 and is not spaced apart from the crystal. If the aperture were spaced apart from the crystal by a distance D, variation in the spacing distance D and in the angular orientation of a plane containing the aperture may occur (e.g. due to external perturbation) and interfere with operation of the filter.

Figure 5:
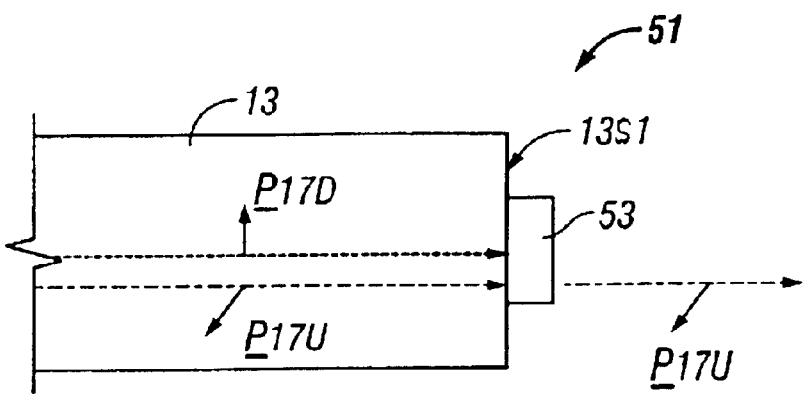
FIG. 5 schematically illustrates an output coupler where the diffracted and undiffracted beams have orthogonal polarizations.

FIG. 5 schematically illustrates an output coupler system 51 suitable for use in cases where the zeroth and first order beams are orthogonally polarized. In most cases of practical interest, including the preferred configuration of FIG. 3, birefringent AO interactions are employed, where the zeroth and first order beams are approximately orthogonally polarized. The optical beams, 17U and 17D, are received by a polarization analyzer 53, located on the crystal face 13S1 in a selected plane II and oriented so that no light having polarization direction $p_{17D}$ is passed by the analyzer 53, and thus no portion of the beam 17D issues from the crystal 13. A substantial fraction of beam 17U, having the polarization direction $p_{17U}$, is passed through the analyzer 53 and issues from the crystal 13. The output coupler system 51 is again affixed to, or part of, the crystal 13, to avoid problems of analyzer alignment that may occur where the analyzer is spaced apart from the crystal, and to avoid emission of extraneous optical beams.

Figure 6:
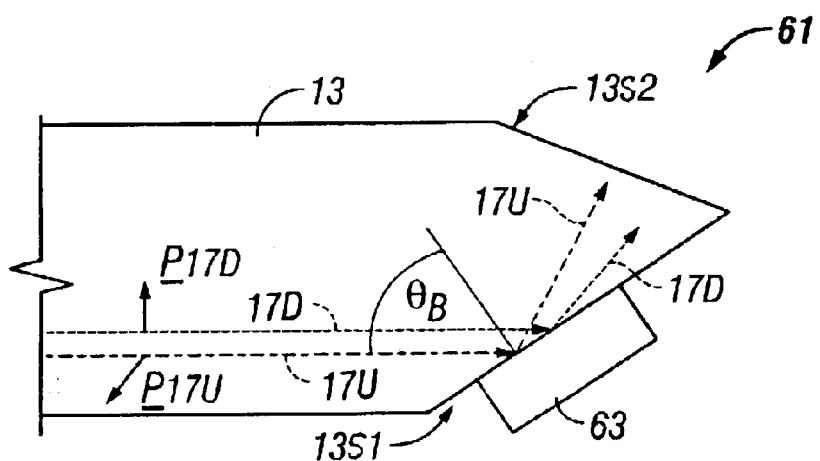
FIGS. 6, 7, 8 and 9 schematically and graphically illustrate reflective output couplers for suppressing the diffracted beam.

FIG. 6 schematically illustrates another output coupler system 61 for suppressing the diffracted beam 17D, suitable for use in cases where the zeroth and first order beams are orthogonally polarized. Polarization of a beam approaching the interface 13S1 can be expressed as a sum of a polarization vector $p_p$ that lies in the plane of incidence (the p-component) and a polarization component $p_s$ that is perpendicular to the plane of incidence (the s-component). The beams 17D and 17U approach the surface 13S1, which is oriented so that the beam polarization directions, $p_{17D}$ and $p_{17U}$, respectively, lie in the incidence plane (p-component) and perpendicular to the incidence plane (s-component) for the interface 13S1.

Where a beam having a p-component and an s-component of polarization, $A_p$ and $A_s$, respectively, is incident upon an interface between two media with different refractive indices ($n_c$ for the crystal and $n_{amb}$ for the ambient medium surrounding the crystal), the Fresnel relations for the reflected and transmitted p-components and s-components of the incident optical beam become $$T_p = A_p \cdot 2 \sin\theta_i \cos\theta_1 / \{\sin(\theta_1+\theta_i) \cdot \cos(\theta_1-\theta_i)\}, \quad (3A)$$

$$T_s = A_s \sin\theta_i \cos\theta_1 / \sin(\theta_1+\theta_i), \quad (3B)$$

$$R_p = A_p \cdot \tan(\theta_1-\theta_i)/\tan(\theta_1+\theta_i), \quad (3C)$$

$$R_s = -A_s \cdot \sin(\theta_1-\theta_i)/\sin(\theta_1+\theta_i), \quad (3D)$$

where the well known Snell relation $$n_c \cdot \sin\theta_i = n_m \cdot \sin\theta_t \quad (4)$$

applies. These relations are developed in M. Born and E. Wolf, *Principles of Optics*, Pergamon Press, Oxford, Fifth Edition, 1975, pp. 36–40.

For a given crystal material, the surface 13S1 is oriented so that the diffracted beam incidence angle is equal to the Brewster angle ($\theta_1 = \theta_B$), to eliminate reflection of the p-polarized diffracted beam, where $\theta_B$ is given by $$\tan\theta_B = n_{amb}/n_c. \quad (5)$$

With this choice of diffracted beam incidence angle, the Fresnel relations for the diffracted beam become $$T_p = A_p, \quad (6A)$$

$$T_s = A_s \cdot \sin(2\theta_i), \quad (6B)$$

$$R_p = 0, \quad (6C)$$

$$R_s = A_s \cdot \cos(2\theta_1). \quad (6D)$$

As can be seen in FIG. 6, the undiffracted beam 17U generally gives rise to a reflected beam and a transmitted beam, and similarly for the diffracted beam 17D. Because the beam 17D is p-polarized and is incident on the surface 13S1 at the Brewster angle, the reflected beam arising from beam 17D has zero amplitude. With this arrangement, the surfaces 13S1 and 13S2 act together as an output coupler to suppress the reflection of the diffracted beam and allow a portion of the undiffracted beam to issue from the crystal 13.

Here, the output coupler system 61 includes a first surface 13S1, oriented so that the diffracted beam polarization $p_{17D}$ lies in the incidence plane for this surface and so that the diffracted beam incidence angle is equal to the Brewster angle for this surface. Optionally, the system 61 includes a second surface 13S2 through which the reflected polarization component $R_{s,U}$ for the undiffracted beam issues from the crystal 13. The system 61 is part of the crystal 13. Alternatively, the system 61 may include a second medium 63, having a refractive index $n_m$, that is affixed to the crystal 13 at the surface 13S1. Use of a second medium 63 may allow more flexibility in choice of the remainder of the system 61. Second medium 63 can be made of a material which is strongly absorbing at the wavelength of beam 17D, so that beam 17D is not emitted from the output coupler assembly of FIG. 6.

Figure 2:
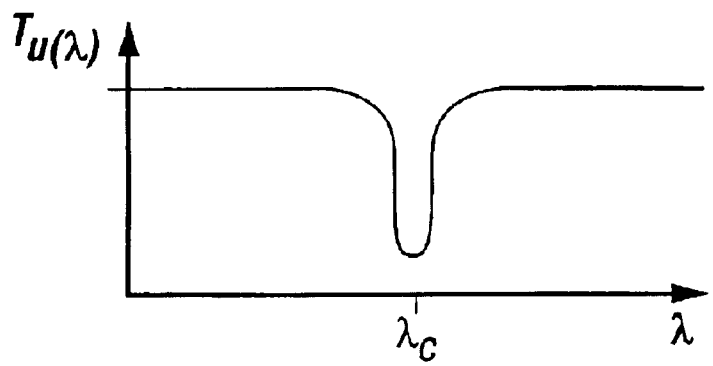
FIG. 2 graphically illustrates the transmittance of a zeroth order beam versus incident light beam wavelength through an AO device.

An output signal from any of the output coupler systems, 41, 51 and 61, illustrated in FIGS. 4, 5 and 6, will include only the undiffracted beam, which has been spectrally filtered as indicated in FIG. 2.

Figure 7:
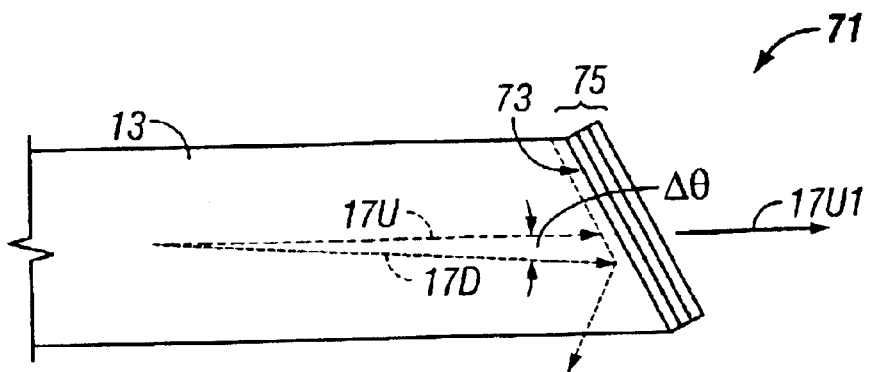

FIG. 7 illustrates another embodiment 71, where the undiffracted beam 17U and the diffracted beam 17D are received at different incidence angles (with an incidence angle difference $\Delta\theta \approx 1-5°$) at an exit face 73 of the crystal 13. A multilayer thin film coating 75, attached to the exit face 73, is selected so that through optical interference, a substantial portion or all 17U1 of the incident undiffracted beam 17U is transmitted through the exit face 73 and the multilayer film 75, and substantially all of the incident diffracted beam 17D is reflected from the exit face 73 and multilayer film 75 and does not exit from the crystal at the exit face 73.

Figure 8:
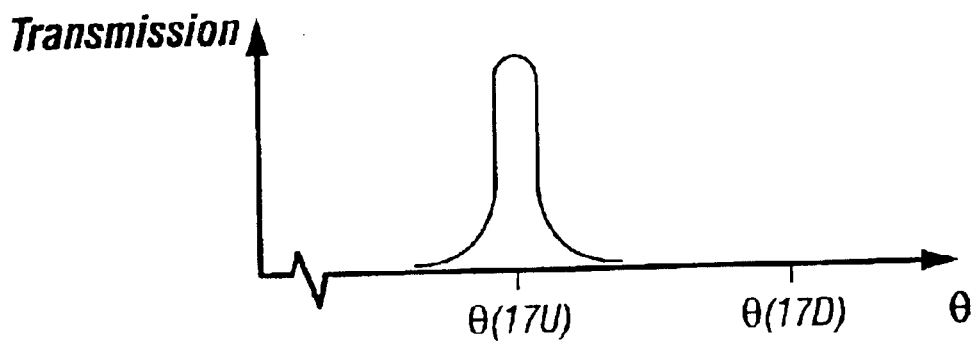

The multilayer film 75 attached to the exit face 73 preferably has a narrow transmission pass band, centered at a selected beam incidence angle θ at the exit face. The undiffracted beam 17U and the diffracted beam 17D have different incidence angles, and a central transmission angle $\theta_c$ is chosen so that the undiffracted beam incidence angle, θ=θ(17U), but not the diffracted beam incidence angle, θ=θ(17D), lies within the pass band, as illustrated in FIG. 8.

Figure 9:
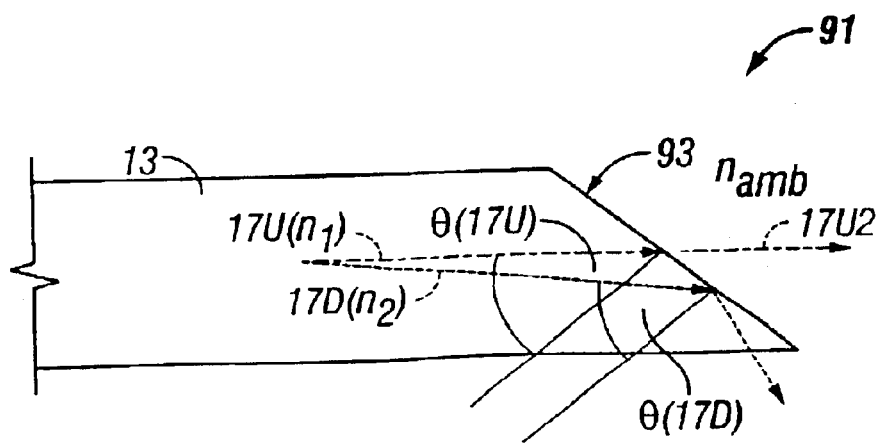

FIG. 9 illustrates another embodiment 91, where the undiffracted beam 17U and the diffracted beam 17D are received at an exit face 93 of the crystal 13 at incidence angles θ(17U) and θ(17D), correspond to different refractive indices, n1 and n2, and have different states of polarization. The incidence angles, θ(17U) and θ(17D), of the respective undiffracted beam 17U and diffracted beam are chosen to satisfy $$n1 \cdot \sin\theta(17U) < n_{amb} < n2 \cdot \sin\theta(17D), \quad (7)$$

where $\theta(TIR, 17D) = \sin^{-1}(n_2/n_{amb})$ is the angle for total internal reflection for the diffracted beam 17D.

The undiffracted beam 17U is received at the exit face 93, and a substantial portion of this incident beam is transmitted through the exit face 93 and out of the crystal 13, as a beam 17U2. None of the incident diffracted beam 17D is transmitted through the exit face 93 and out of the crystal 13, because of total internal reflection at the exit face 93.

What is claimed is:

1. Acousto-optical apparatus for filtering an incident light beam, the apparatus comprising:

a crystal, positioned to receive an incident light beam having a selected first light beam propagation path through the crystal, the first path comprising at least one optical path segment;

an acoustic wave transducer, affixed to or positioned within the crystal, to excite within the crystal an acoustic wave, having a selected acoustic frequency, a selected acoustic beam propagation path within the crystal, the acoustic path comprising at least one acoustic path segment, to thereby allow interaction of the acoustic wave with the incident light beam to provide an undiffracted light beam propagating along the first path and a diffracted light beam having a second wavelength and a second beam propagation path that is noncollinear with the first beam propagation path; and an output coupler, affixed to or positioned within the crystal at a selected crystal face, to receive and transmit at least a portion of the undiffracted light beam and to receive and suppress the diffracted light beam, the output coupler comprising an exit face for the crystal, having a selected multilayer thin film attached to the exit face and oriented relative to the first and second beam propagation paths so that a non-zero portion of the undiffracted light beam is transmitted through the exit face and multilayer film and exits from the crystal, and substantially all of the diffracted beam is reflected by the multilayer film and does not exit from the crystal at the exit face.

2. The apparatus of claim 1, wherein a segment of said first path, along which said incident light beam has a selected optical phase velocity, is substantially collinear with a segment of said acoustic path, along which said acoustic beam has a selected acoustic phase velocity.

3. The apparatus of claim 2, wherein said optical phase velocity and said acoustic phase velocity are not collinear.

4. A method for filtering an incident light beam, the method comprising:

providing a crystal, positioned to receive an incident light beam having a selected first light beam propagation path through the crystal, the first path comprising at least one optical path segment;

providing an acoustic wave transducer, affixed to or positioned within the crystal, to excite within the crystal an acoustic wave, having a selected acoustic frequency, a selected acoustic beam propagation path within the crystal, the acoustic path comprising at least one acoustic path segment, and allowing interaction of the acoustic wave with the incident light beam to provide an undiffracted light beam propagating along the first path and a diffracted light beam having a second wavelength and a second beam propagation path that is noncollinear with the first beam propagation path; and providing an output coupler, affixed to or positioned within the crystal at a selected crystal face, to receive and transmit at least a portion of the undiffracted light beam and to receive and suppress the diffracted light beam; and providing an exit face for the crystal, having a selected multilayer thin film attached to the exit face and oriented relative to the first and second beam propagation paths so that a non-zero portion of the undiffracted light beam is transmitted through the exit face and multilayer film and exits from the crystal, and substantially all of the diffracted beam is reflected by the multilayer film and does not exit from the crystal at the exit face.

5. The method of claim 4, further comprising providing a segment of said first path, along which said incident light beam has a selected optical phase velocity, substantially collinear with a segment of said acoustic path, along which said acoustic beam has a selected acoustic phase velocity.

6. The method of claim 5, further comprising providing said optical phase velocity and said acoustic phase velocity as noncollinear.

7. Acousto-optical apparatus for filtering an incident light beam, the apparatus comprising:

a crystal, positioned to receive an incident light beam having a selected first light beam propagation path through the crystal, the first path comprising at least one optical path segment;

an acoustic wave transducer, affixed to or positioned within the crystal, to excite within the crystal an acoustic wave, having a selected acoustic frequency, a selected acoustic beam propagation path within the crystal, the acoustic path comprising at least one acoustic path segment, to thereby allow interaction of the acoustic wave with the incident light beam to provide an undiffracted light beam propagating along the first path and a diffracted light beam having a second wavelength and a second beam propagation;

wherein, within the crystal, the undiffracted light beam and the diffracted light beam correspond to first and second refractive indices, n1 and n2, respectively; and an output coupler, affixed to or positioned within the crystal at a selected crystal face, to receive and transmit at least a portion of the undiffracted light beam and to receive and suppress the diffracted light beam, the output coupler comprising an exit face for the crystal, oriented relative to the first and second beam propagation paths so that a non-zero portion of the undiffracted light beam is transmitted through the exit face and exits from said crystal, and substantially all of the diffracted beam is reflected by, and does not exit the crystal at, the exit face.

8. The apparatus of claim 7, wherein said exit face orientation is chosen so that said undiffracted light beam and said diffracted light beam approach said exit face with incidence angles $\theta(U)$ and $\theta(D)$, respectively, that satisfy $n1 \cdot \sin \theta(U) < n_{amb} < n2 \cdot \sin \theta(D)$, where $n_{amb}$ is a refractive index for an ambient medium outside said crystal and adjacent to said exit face.

9. The apparatus of claim 7, wherein a segment of said first path, along which said incident light beam has a selected optical phase velocity, is substantially collinear with a segment of said acoustic path, along which said acoustic beam has a selected acoustic phase velocity.

10. The apparatus of claim 9, wherein said optical phase velocity and said acoustic phase velocity are not collinear.

11. A method for filtering an incident light beam, the method comprising:

providing a crystal, positioned to receive an incident light beam having a selected first light beam propagation path through the crystal, the first path comprising at least one optical path segment;

providing an acoustic wave transducer, affixed to or positioned within the crystal, to excite within the crystal an acoustic wave, having a selected acoustic frequency, a selected acoustic beam propagation path within the crystal, the acoustic path comprising at least one acoustic path segment, and allowing interaction of the acoustic wave with the incident light beam to provide an undiffracted light beam propagating along the first path and a diffracted light beam having a second wavelength and a second beam propagation path that is noncollinear with the first beam propagation path, where the undiffracted light beam and the diffracted light beam propagate with corresponding refractive indices n1 and n2, respectively;

providing an output coupler, affixed to or positioned within the crystal at a selected crystal face, to receive and transmit at least a portion of the undiffracted light beam and to receive and suppress the diffracted light beam; and orienting an exit face for the crystal, relative to the first and second beam propagation paths, so that a non-zero portion of the undiffracted light beam is transmitted through the exit face and exits from the crystal, and substantially all of the diffracted beam is reflected by, and does not exit from the crystal at, the exit face.

12. The method of claim 11, further comprising choosing said exit face orientation so that said undiffracted light beam and said diffracted light beam approach said exit face with incidence angles $\theta(U)$ and $\theta(D)$, respectively, that satisfy $n1 \cdot \sin \theta(U) < n_{amb} < n2 \cdot \sin \theta(D)$, where $n_{amb}$ is a refractive index for an ambient medium outside said crystal and adjacent to said exit face.

13. The method of claim 11, further comprising providing a segment of said first path, along which said incident light beam has a selected optical phase velocity, substantially collinear with a segment of said acoustic path, along which said acoustic beam has a selected acoustic phase velocity.

14. The method of claim 13, further comprising providing said optical phase velocity and said acoustic phase velocity as noncollinear.

* * * * *